(12) United States Patent
Tucker

(10) Patent No.: US 10,589,332 B2
(45) Date of Patent: Mar. 17, 2020

(54) SOIL AUGER AND METHOD OF MANUFACTURE

(71) Applicant: Sentek Pty Ltd., South Australia (AU)

(72) Inventor: Peter Tucker, South Australia (AU)

(73) Assignee: SENTEK PTY LTD, South Australia (AU)

( * ) Notice: Subject to any disclaimer, the term of this patent is extended or adjusted under 35 U.S.C. 154(b) by 468 days.

(21) Appl. No.: 15/303,154

(22) PCT Filed: Apr. 10, 2015

(86) PCT No.: PCT/AU2015/000206
§ 371 (c)(1),
(2) Date: Oct. 10, 2016

(87) PCT Pub. No.: WO2015/154130
PCT Pub. Date: Oct. 15, 2015

(65) Prior Publication Data
US 2017/0120315 A1    May 4, 2017

(30) Foreign Application Priority Data
Apr. 10, 2014 (AU) ................................ 2014901321

(51) Int. Cl.
*B21C 37/26* (2006.01)
*B21F 3/10* (2006.01)
(Continued)

(52) U.S. Cl.
CPC ............... *B21C 37/26* (2013.01); *B21F 3/10* (2013.01); *B21K 5/02* (2013.01); *B23K 31/025* (2013.01);
(Continued)

(58) Field of Classification Search
CPC .. B21C 37/26; B21F 3/10; B21K 5/02; B23K 2101/002; B23K 2101/08; B23K 31/025;
(Continued)

(56) References Cited

U.S. PATENT DOCUMENTS

| | | | | |
|---|---|---|---|---|
| 1,893,077 A | * | 1/1933 | Garweg | C21D 1/58 |
| | | | | 148/218 |
| 2,603,319 A | * | 7/1952 | Dyche | E02D 5/801 |
| | | | | 175/394 |

(Continued)

FOREIGN PATENT DOCUMENTS

| | | |
|---|---|---|
| AU | 2002331464 B2 | 10/2002 |
| AU | 760525 B2 | 5/2003 |

(Continued)

OTHER PUBLICATIONS

Search Report for Chinese Patent Application No. 2015800302606, dated Nov. 28, 2017, 2 pages.

(Continued)

*Primary Examiner* — Jenny R Wu
(74) *Attorney, Agent, or Firm* — Westman, Champlin & Koehler, P.A.

(57) ABSTRACT

An auger useable for creating an opening in the ground for a soil sensor housing wherein the sensor housing has a predetermined volume and a tapered outer surface, includes an auger made in accordance with the methods described and defined in this specification. The auger having a shaft having an outer surface of circular cross-section having an larger outer diameter at one end than the other end and a strip material having a helical shape with an inner wall having a larger inner diameter at one end than the other end of the helical shape wherein the helically shaped material is fixed over the outer diameter of the shaft to form a tapered auger with helical flighting. The volume of the opening created by an auger in the ground will provide a matching volume for (Continued)

a sensor housing of a predetermined volume such that substantially the full length of the tapered outer surface of the sensor is adjacent the ground along the full length/depth of the created opening.

12 Claims, 8 Drawing Sheets

(51) Int. Cl.
| | |
|---|---|
| *B21K 5/02* | (2006.01) |
| *E21B 17/22* | (2006.01) |
| *B23K 31/02* | (2006.01) |
| *C21D 1/06* | (2006.01) |
| *C21D 1/18* | (2006.01) |
| *C21D 1/58* | (2006.01) |
| *C21D 9/22* | (2006.01) |
| *E21B 10/44* | (2006.01) |
| *B23K 101/00* | (2006.01) |
| *B23K 101/08* | (2006.01) |

(52) U.S. Cl.
CPC .............. *C21D 1/06* (2013.01); *C21D 1/18* (2013.01); *C21D 1/58* (2013.01); *C21D 9/22* (2013.01); *E21B 10/44* (2013.01); *E21B 17/22* (2013.01); *B23K 2101/002* (2018.08); *B23K 2101/08* (2018.08)

(58) Field of Classification Search
CPC ... C21D 1/06; C21D 1/18; C21D 1/58; C21D 9/22; E21B 10/44; E21B 17/22
See application file for complete search history.

(56) References Cited

U.S. PATENT DOCUMENTS

| | | | | |
|---|---|---|---|---|
| 3,382,937 | A | * | 5/1968 | Watts ...................... E21B 17/22 |
| | | | | 175/323 |
| 3,485,116 | A | | 12/1969 | Fender |
| 4,929,885 | A | * | 5/1990 | Dishman .............. G01N 27/223 |
| | | | | 324/664 |
| 5,353,883 | A | | 10/1994 | Kattentidt et al. |
| 5,418,466 | A | | 5/1995 | Watson et al. |
| 6,443,040 | B1 | | 9/2002 | Marchesini |
| 7,042,234 | B2 | | 5/2006 | Buss |
| 7,240,743 | B2 | | 7/2007 | Buss et al. |
| 2016/0061762 | A1 | | 3/2016 | Buss |

FOREIGN PATENT DOCUMENTS

| | | | |
|---|---|---|---|
| CA | 2252127 | A1 | 4/2000 |
| CN | 1283140 | A | 2/2001 |
| CN | 103909349 | A * | 7/2014 |
| EP | 0 588 143 | A1 | 3/1994 |
| EP | 1 277 887 | A2 | 1/2003 |
| GB | 2 377 235 | A | 1/2003 |
| JP | S60-161815 | A | 8/1985 |
| NL | 1027150 | C2 | 4/2006 |
| WO | 99/32240 | A1 | 7/1999 |
| WO | 2014/165910 | A1 | 10/2014 |

OTHER PUBLICATIONS

International Search Report and Written Opinion for International Application No. PCT/AU2015/000206, dated Jun. 10, 2015, 9 pages.
Second Office Action for Chinese Patent Application No. 201580030260.6, dated Aug. 24, 2018, 2 pages.
First Office Action for Chinese Patent Application No. 201580030260.6, dated Dec. 5, 2017, 2 pages.
Extended European search report, pursuant to Rule 62 EPC, for European Patent Application No. 15777385.4, dated Oct. 20, 2017, 7 pages.

* cited by examiner

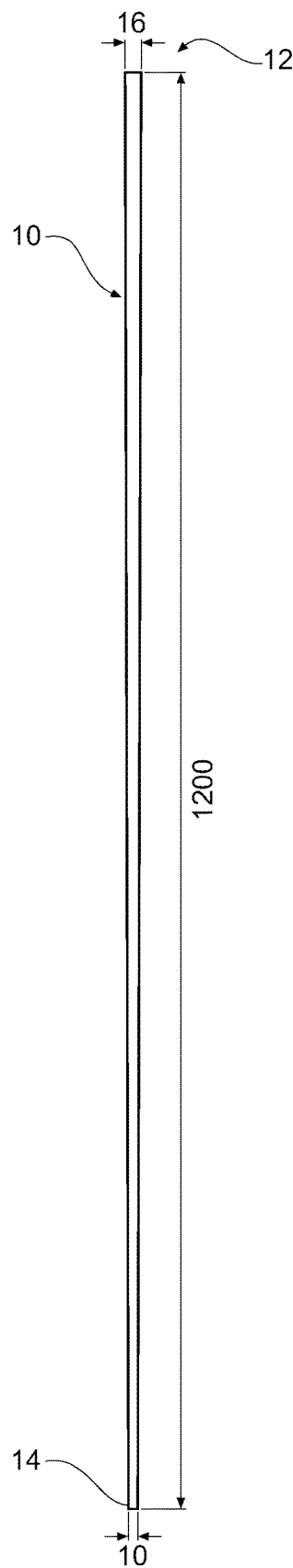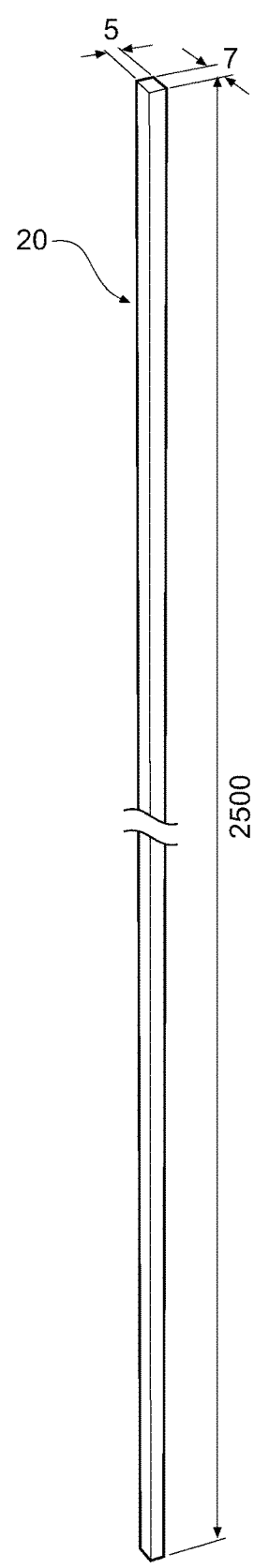
*Figure 1*  *Figure 2*

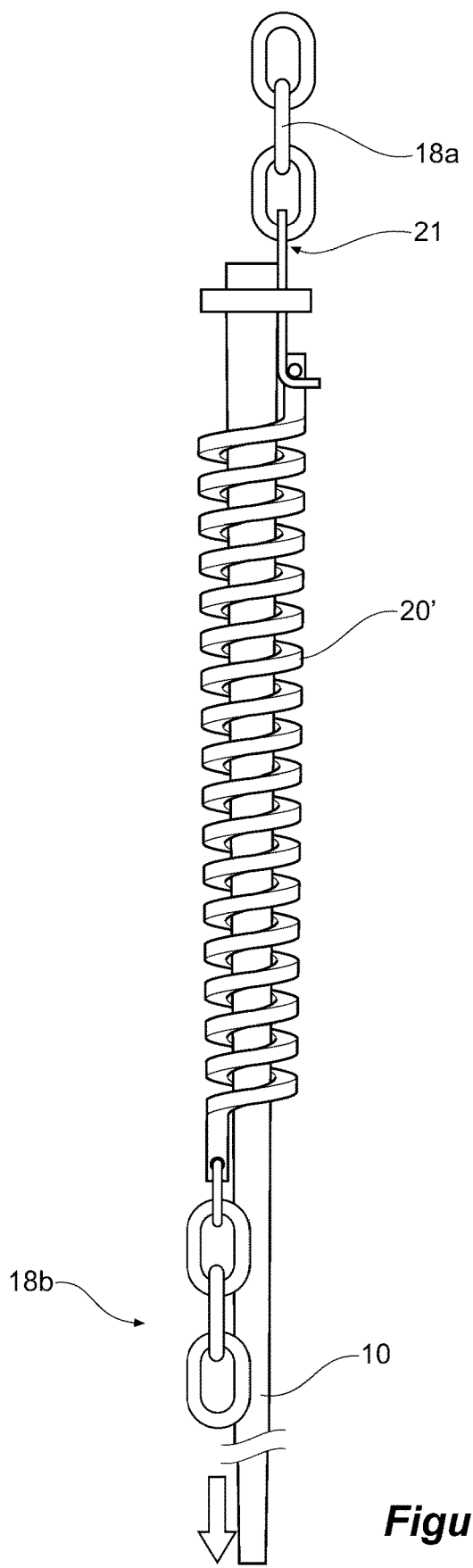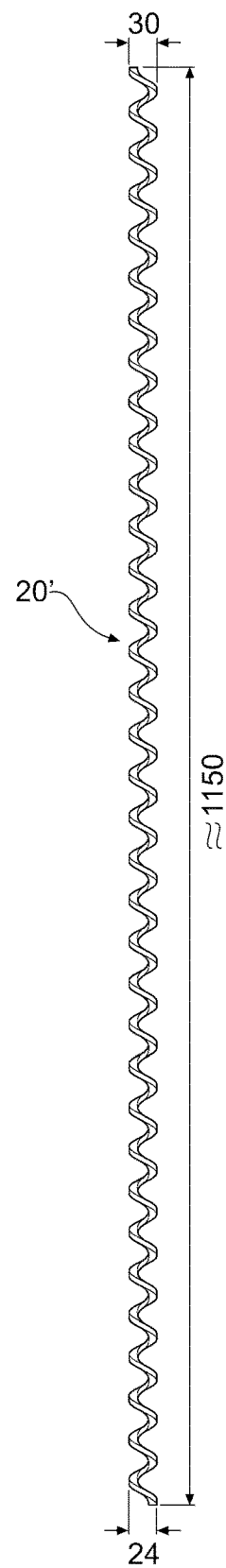
*Figure 3B*
*Figure 3C*

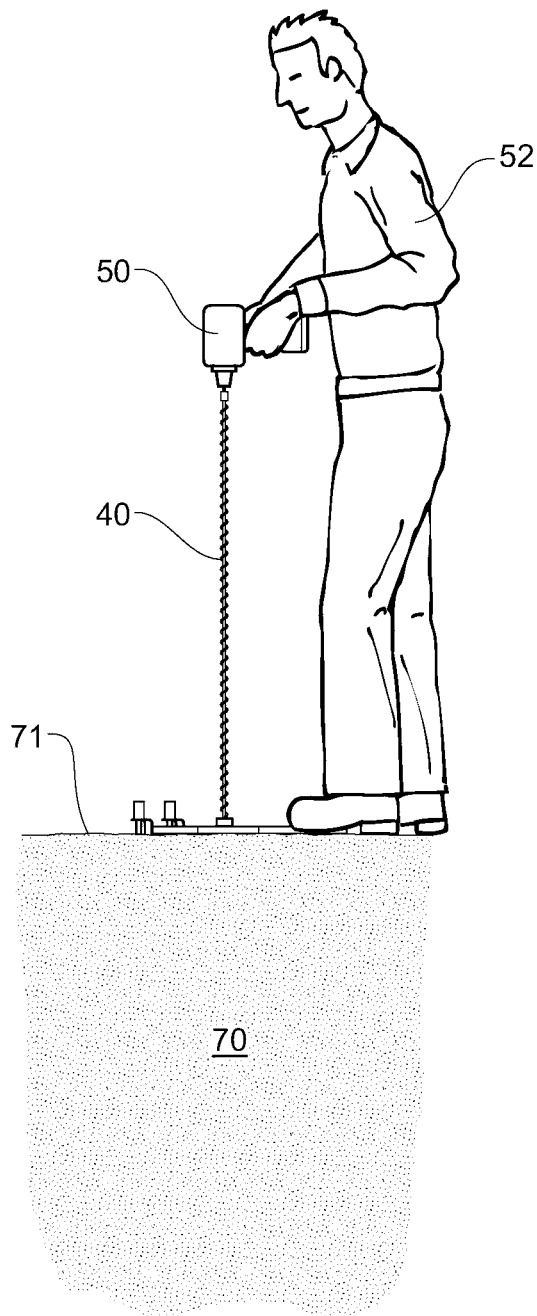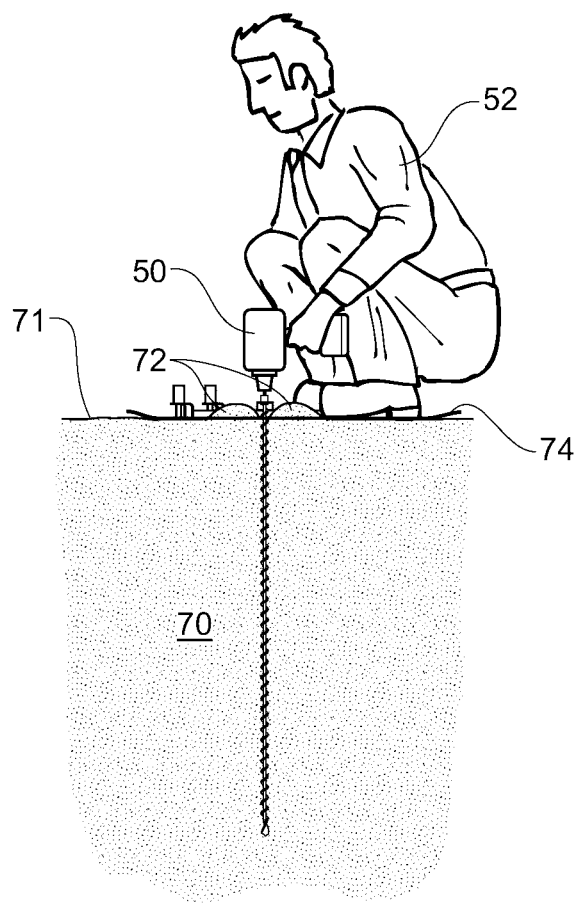
*Figure 6*  *Figure 7*

SOIL AUGER AND METHOD OF MANUFACTURE

CROSS-REFERENCE TO RELATED APPLICATION

This Application is a Section 371 National Stage Application of International Application No. PCT/AU2015/000206, filed 10 Apr. 2015 and published as WO 2015/154130 A8 on 15 Oct. 2015, in English, the contents of which are hereby incorporated by reference in their entirety.

PRIORITY DOCUMENTS

The present application claims priority from Australian Provisional Patent Application No. 2014901321 entitled "Soil Auger and Method of Manufacture" and filed on 10 Apr. 2014, the content of which is hereby incorporated by reference in its entirety

TECHNICAL FIELD

The field is apparatus to install elongate sensors in the ground and in particular the manufacture of apparatus to create the opening in the ground in which a tapered elongate soil sensor is placed.

BACKGROUND

The field of apparatus to install elongate soil sensors is dependant largely on the form of the many types of soil sensors that are available and the type of material or soil into which the sensor is to be placed. The applicant is the inventor and designer of many soil sensors as disclosed in U.S. Pat. No. 5,418,466 entitled "For indicating complex dielectric constant/conductivity of a medium" filed 11 Oct. 1991; AU760525 entitled "Automatic depth sensing detection for portable soil moisture probes" filed 12 Jul. 1999; AU2002331464 entitled "Soil probe insertion arrangement and method of use" filed 4 Oct. 2002; U.S. Pat. No. 7,042,234 entitled "Soil matric potential and salinity measurement apparatus and method of use" filed 16 Dec. 2003; U.S. Pat. No. 7,240,743 entitled "Soil probe insertion arrangement and method of use" filed 4 Oct. 2002, and PCT/AU2014/000383 entitled "Tapered Soil Moisture Sensor Arrangement and Method of Installation" filed 10 Apr. 2014. The information disclosed in all the above mentioned patents and patent applications is incorporated by reference into this specification.

All the sensor housings disclosed in the abovementioned patents and patent application are elongate to permit multiple sensors to be located at various depths in the soil or material to be sensed, and of particular note is that the housings (except PCT/AU2014/000383 and the priority application) are all cylindrical and have a constant diameter along the full inserted length.

The apparatus of the type that is designed to create a cylindrical hole in the ground into which an elongate sensor housing is to be placed is typically referred to as an auger.

An auger is a drilling device, or drill bit, that usually includes a rotating helical screw blade called "flighting" to act as a screw conveyor to remove the drilled out material from the opening as it is being created. The rotation of the screw blade causes the material to be cut and the flighting moves the cut material out of the opening being drilled.

An auger used for digging cylindrical openings in the ground is called an 'earth auger', 'handheld power earth drill', 'soil auger' or 'mechanised post digger'. This kind of auger can be a manually turned handheld device, and alternatively can be powered by an electric motor or internal-combustion engine, or even attached to a tractor's power take-off.

An auger suitable for the preparation of an opening in the ground suitable for the insertion of a cylindrical soil sensor housing has a construction including; a continuous helical flighting extending from an inserted end along a constant diameter shank to a head end of the shank. Manually operated augers are manipulated using a handle member that extends at right angles to the shank and extends away from the shank a distance long enough for a person to apply a twisting motion to the shank using the handle to turn the auger into the ground and at the same time the user applies a downward pressure to the auger to force the inserted end of the auger into the ground. A sharpened edge on the free end of the flighting at the inserted end or a pre-formed blade fixed to the inserted end of the auger assists the auger to penetrate into the ground.

The referenced sensors (except PCT/AU2014/000383 and the priority application) are all housed in elongate cylindrical housings and the reasons for carefully creating a cylindrical opening in the material, typically the ground, to be sensed include the following:

a. To ensure that the ground in the immediate vicinity of the sensor housing and hence the sensors therein remains as undisturbed as possible.
  b. That the physical fitment between the sensor housing and the surrounding ground is such that there is no gap or gaps between the surrounding soil and the outer surface of the elongate soil sensor housing along substantially its full length. Gaps, if they existed, would create the potential for the creation of preferential ground water seepage channels from the surface of the soil, or air gaps, in the immediate vicinity of the sensor which will skew or make unusable the readings of soil moisture and other characteristics of the surrounding soil detected by the sensor/s within the sensor housing.

These reasons do not become an issue if the gap or gaps are not present but to achieve that outcome using the prior auger arrangements there is a need to ensure that the inner wall of the opening created by the auger is relatively smooth and of constant inner diameter along its full depth. This has been achieved, as described in at least one of the referenced documents, by slightly under-sizing the opening created by the auger relative to the constant outer diameter of the inserted sensor housing, and cutting or slicing away a portion of the inner wall of the prepared opening with the inserted end of the sensor housing adapted to do that slicing as it is inserted into the prepared opening.

It will be noted in the mentioned patent documents that the elimination of a gap or gaps between the sensor housing and surrounding soil is identified as a requirement for the proper operation of the in-situ soil sensor. However, the installation process described in those documents does not ensure that outcome. One problem encountered includes, that any wobbling of the auger by the operator during the creation of the opening can create larger excursions from the sheared volume created when the sensor housing with a cutting arrangement is inserted, such that gaps are left at one or more locations along the length of the inserted sensor housing. If the gap, when air filled is substantial enough or if the gap is occupied by water, the sensor measurements in the gap regions will not be indicative of the soil characteristics in the field of influence of the sensor near or at those gap regions.

BRIEF DESCRIPTION OF ASPECTS

None of the soil sensor arrangement disclosed in the referenced documents (except PCT/AU2014/000383 and the priority application) or otherwise known to the inventor have a tapered outer surface wherein a housing including an elongate body with a head end, an inserted end, and an outer surface being continuously tapered from the head end to the inserted end, and at least one soil moisture sensor located within the housing, wherein, in use, the housing is located within the prepared opening and the outer surface of the housing is in conformance with the surface of the prepared opening along substantially the full length of the housing and the or each sensor provides for the measurement of at least the moisture of the soil in which the sensor arrangement is inserted.

Therefore, the type of auger used previously and described above is not suitable for the creation of an opening for a sensor housing having a tapered outer surface.

A reason to use a tapered sensor in a tapered opening is the realisation that the elimination of a gap is assured because the downward motion of the sensor into a complimentarily shaped opening ensures that the outer surface of the sensor will apply an pressure over the total outer area of the full inserted length of the sensor housing against the soil surface forming the opening. The greater the downward force on the sensor housing the greater the pressure and the greater likelihood there will be no gaps between the outer area of the sensor housing and the soil surface forming the opening. No amount of downward force applied to a soil sensor housing as described in the mentioned patents will have the same effect as described in this paragraph and associated with the use of sensor soil moisture and other sensors having a tapered housing.

Thus there is a need for an auger that can create an internally tapered opening for complimentarily shaped tapered sensor housing.

In a broad aspect there is provided a method of forming an auger useable for creating an opening in the ground, including: forming a shaft having an outer surface of circular cross-section having an larger outer diameter at one end than the other end; forming a rectangular strip material into a helical shape having an inner wall with a larger inner diameter at one end than the other end; passing the helically shaped material over the outer diameter of the shaft until a portion of the inner wall of the helically shaped material abuts the outer surface of the shaft; and fixing the helically shaped material to the shaft to form a tapered auger with tapered helical flighting.

In an aspect the method includes the helically shaped material having a pitch which increases from that at the smaller outer diameter of the shaft towards the larger outer diameter of the shaft.

In an aspect the method includes the further step of fixing a cutting edge member to the smaller outer diameter end of the shaft.

In yet a further aspect the cutting edge member is also fixed to the adjacent end of the helically shaped material.

In an aspect the method of forming the rectangular strip material into a helix includes the following step of fixing one end of the strip to the spindle and rotating the spindle while drawing the strip onto a mandrel.

In an aspect the method of forming the auger further includes the following step of surface hardening the formed auger.

In an aspect the hardening step is by immersion into heated cyanide solution, followed by an oil quench.

In an aspect the hardening step is by induction hardening of a annealed strip of material formed and fixed to a shaft.

In a further aspect the shaft has an average taper of 5 mm per lineal metre.

In a further aspect the shaft is 1200 mm long having a 6 mm difference from the largest outer diameter end to the smallest outer diameter end of the shaft.

In an aspect the strip material is rectangular in cross-section.

In a further aspect the strip material has a 5 to 7 ratio of thickness to breadth.

In a further aspect the strip material is 2500 mm long before being formed into a helical shape.

In second aspect is a method of forming an auger useable for creating an opening in the ground, including: forming a shaft having an outer surface of circular cross-section having constant outer diameter; forming from a strip material having a width that reduces uniformly along the length of the strip into a helical shape having an outer wall with a larger outer diameter at one end than the other end and a substantially constant diameter inner wall; passing the helically shaped strip material over the shaft and the dimensions of the outer diameter of the shaft and the diameter of the inner wall of the strip material having a helical shape being such that the outer surface of the shaft abuts the inner wall of the helically shaped strip material; and fixing the helically shaped material to the shaft to form an auger with tapered helical fighting.

In an aspect the method includes the further step of fixing a cutting edge member to an end of the shaft described in the previous paragraph.

In yet a further aspect the cutting edge member is also fixed to the adjacent end of the helically shaped material described in the previous paragraph.

In an aspect the method of forming the rectangular strip material includes the following step of laser cutting a strip of material into a trapezoid shape.

In an aspect the method includes forming the laser formed strip material into a helically shaped material.

In an aspect the formed pitch is 10 mm and constant along the full length of the formed helix.

In an aspect the method of forming the auger further includes the following step of surface hardening the formed auger.

In an aspect the hardening step is by immersion into heated cyanide solution, followed by an oil quench.

In a further broad aspect an auger useable for creating an opening in the ground for a soil sensor use in the ground having a predetermined volume and a tapered outer surface, includes, a shaft having an outer surface of circular cross-section having an larger outer diameter at one end than the other end; and a strip material having a helical shape with an inner wall having a larger inner diameter at one end than the other end of the helical shape wherein the helically shaped material is fixed over the outer diameter of the shaft to form a tapered auger with helical flighting, wherein the volume of the opening created by an auger in the ground will provide a matching volume for a sensor housing of a predetermined volume such that the entire tapered outer surface of the sensor is adjacent the ground along the full length of the created opening.

Although the foregoing has been described in some detail for purposes of clarity of understanding, it will be apparent that certain changes and modifications may be practiced within the scope of the appended claims. It should be noted, that there are many alternative ways of implementing both the process and apparatus.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge particularly the reference to patent applications disclosing a tapered soil sensor housing.

DETAILED DESCRIPTION OF THE DRAWINGS

FIG. 1 depicts an embodiment of a shaft;

FIG. 2 depicts an embodiment of a strip of base material for a flighting;

FIG. 3B depicts an embodiment of an arrangement for placement of the formed flighting as depicted in FIG. 3A onto a shaft as depicted in FIG. 1 to form an auger;

FIG. 3C depicts an embodiment of a flighting formed from the base material depicted in FIG. 2 which is adapted to be fitted to an embodiment of a shaft as depicted in FIG. 1;

FIG. 6 depicts the beginning of the formation of an opening in the ground using an auger and stabilisation apparatus as depicted in FIG. 4 and FIGS. 5A and 5B respectively;

FIG. 7 depicts the full intrusion of the tapered auger depicted in FIG. 4 into the ground to form an opening in the ground;

DETAILED DESCRIPTION OF EMBODIMENTS

Figure 3A:
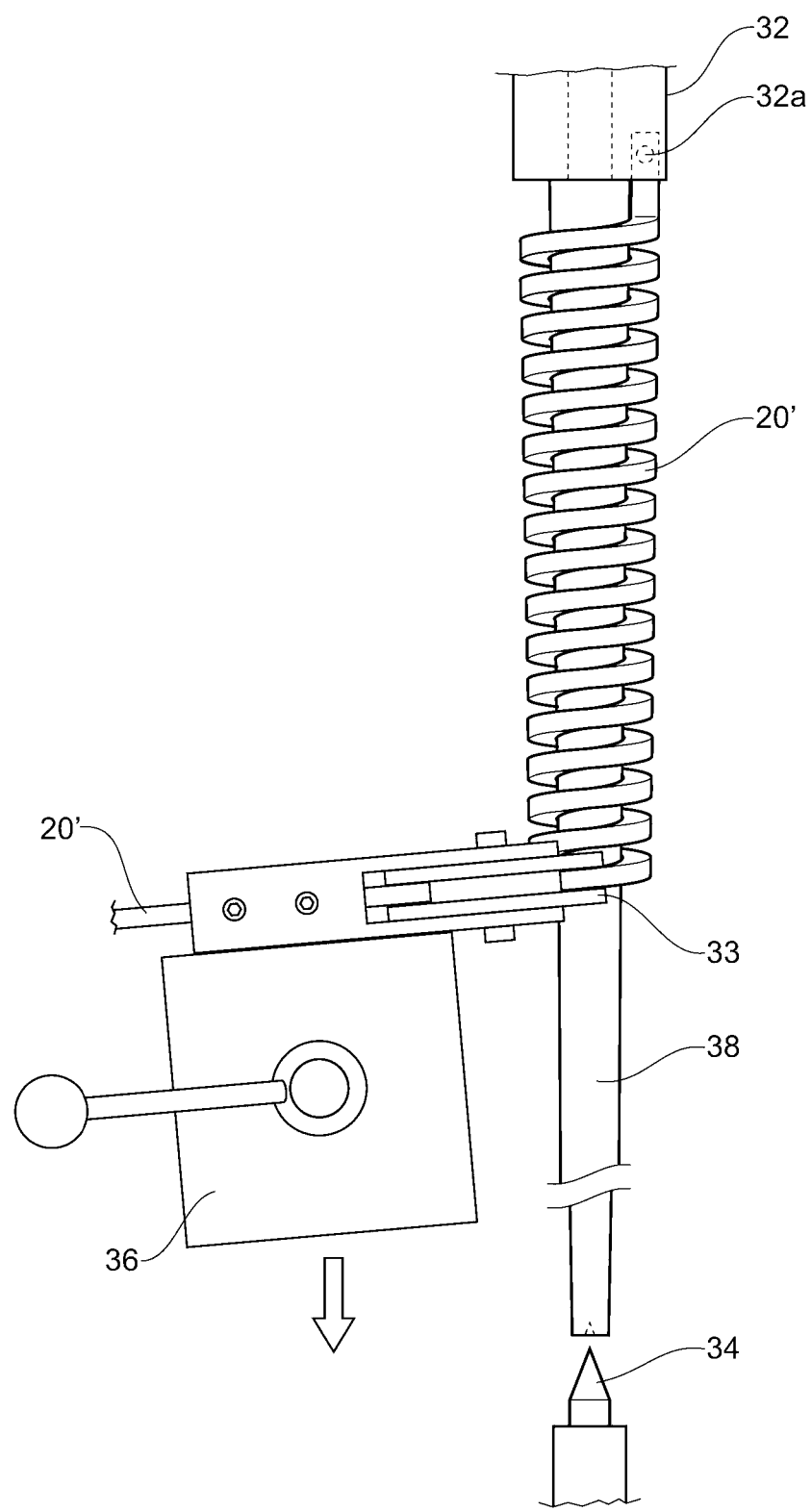
FIG. 3A depicts an embodiment of an arrangement for forming flighting formed from the base material depicted in FIG. 2.

An auger usable for creating an opening in the ground suitable for the insertion of an elongate sensor housing having an outer shape that is circular in cross-section having smaller diameter at the inserted end relative to the non-inserted end (sometimes referred to as the head end) of the sensor housing, involves the practice of a method, in at least one embodiment, which forms an auger of similar outer shape to that of the sensor housing and which is useable in the ground to form an opening into which the sensor housing can be placed and substantially match the inner surface of the opening to the outer surface of the sensor housing.

The method of forming the auger useable for creating an opening in the ground includes in one embodiment, forming a shaft having an outer surface of circular cross-section having a larger outer diameter at one end than the other end. The shaft in one embodiment can be of metal, preferably in one embodiment, of iron and in other embodiments of steel but can be of any suitably strong material and may be solid or hollow. The shaft may be pre-formed by others for later use or may be formed as part of the process. The method of forming a tapered auger can be performed in a variety of steps and may be created by parts formed by others and the step of bringing those parts together to form a tapered auger is described herein.

The method of forming a suitable shaft can include forming or starting with a constant diameter rod (readily available starter material) and modifying the diameter of the rod along its length so that the circular cross-section reduces along its length, which can be achieved using a lathe.

The shaft may also be created from more than one part and may be a two part unit, for example, the shaft may be formed from two parts suitably fixed together.

FIG. 1 depicts an example of the shape of an elongate shaft 10 being about 1410 mm long having a tapered portion of 1200 mm long, circular in cross-section and about 10 mm in outer diameter at the widest end 16 and about 10 mm at the narrowest end 14, thus the shaft has a larger outer diameter at one end than the other end. The shaft can be manufactured by metal lathing wherein it is possible to ensure that the rate of reduction of outer diameter from the larger outer diameter end to the smaller outer diameter end is constant. The taper of the outside of the shaft will preferably be about 5 mm per lineal metre with a preferable accuracy of 0.1 mm along the total length of the shaft.

In one embodiment the method optionally includes of forming a strip of material into a helical shape having an inner wall with a larger inner diameter at one end than the other end. The inner wall is the inward facing side of the formed helical strip, so the inner wall is not continuous when viewed laterally to the coaxial longitudinal axis of the helical shape, i.e. at right angles to the length of the helix. However, it is still possible to measure, estimate or conceive, that there is an effective inner diameter of the helically shaped strip at any particular length along the helical shape, and more so, that a tapered circular cross-section shaft will definitely have an outer diameter which will complement, in shape, the inner wall shape of the helically shaped strip.

In one embodiment the strip of material can be of metal, preferably in an embodiment, of iron. A preferred material of the strip of material is mild steel.

Preferably the strip is rectangular in cross-section. FIG. 2 depicts a rectangular cross-section bar 20 having, in one embodiment, a ratio of width to depth of 5 to 7 and in one embodiment has dimensions of 5 mm thickness by 7 mm breadth, having a length of about 2500 mm. The width of the strip material is relatively narrow compared to the depth to enable the width of the formed flighting to better ream the soil as it progressively enters the created opening in the ground. A wider width would require more force downwards on the auger to displace the soil and effectively cut into the ground. The depth of the strip material is half the width remaining after removing the shaft size at any point on the auger. An embodiment of the strip, not depicted, includes a reduced thickness on the side of the strip that will ream the soil, so as to further reduce the necessary force to rotate the auger while forming the opening in the ground. The reduced thickness can be achieved by chamfering or notching the appropriate corner of the strip using a lathe or other suitable machine. In a further embodiment the strip is formed into a trapezoid having angles such that when formed into a helical shape can be fitted over a tapered or constant diameter shaft to provide flighting that when fixed to the shaft creates an auger with a tapered outer shape from the head end to the inserted end.

The previously described flat bar needs to be formed into a spiral shape (helical coil) and in an embodiment that is achieved by feeding one end of a metal bar of the shape and length depicted in FIG. 2 into a flat bar spiralling machine, one example of such a machine is the R4 Flat Bar Spiralling machine, available from Roundo Hasseleholm, Sweden, which can create a helically shaped bar 20' like that depicted in FIG. 3A or FIG. 3C depending on the program used to control the force applied to the bar as it is drawn into shape by the machine.

In yet a further arrangement for forming the coil it would be possible to wind the coil using a lathe configured to rotate at a workable rate determined by the speed at which the helically shaped coil forming is to take place, while the strip material is drawn in the direction of the arrow (FIG. 3A) along the length of a mandrel 38 (drawing the strip on to a mandrel) which is simultaneously being rotated by the lathe much like a spring maker would form a spring. The workable rate mentioned is not difficult to determine since the desired pitch is known (in one embodiment a 10 mm per revolution will suffice) but any desired pitch can be used to work backwards to determine the workable rate. In any event it is not difficult either to experiment after a rough calculation provides a starting point. FIG. 3A illustrates the arrangement described above, showing a simple illustration of the headstock and spindle of the lathe 32 to which one end of the strip material 20' is fixed at tail stock end 32a and which rotates, further shown is a guide wheel 33 and supporting framework to guide the strip material on to the mandrel at a substantially constant 90° angle to the longitudinal axis of the mandrel which assists to achieve control of the pitch of the helical coil. The spacing between the disc like walls of the wheel is just larger than the width of the strip material and since the side walls of the strip material are parallel the guide can ensure that the underside wall of the strip material is kept substantially parallel to the surface of the mandrel. It may be possible to guide the strip material onto the surface of the mandrel without a guide wheel.

The cross-feed tool 36 on which the wheel is attached is moveable not only along the length of the mandrel 38 but is also able to be moved close to the varying diameter of the mandrel so as to assist the guiding of the strip material onto the outer surface of the mandrel with close conformity between them.

A simple representation of the tailstock end 32a and quill 34 that supports one end of the mandrel 38 allows it to rotate, and a simple representation of a cross-feed tool 36 for supporting and guiding the strip material 20' as it moves along the length of the mandrel so as to draw the strip material onto the mandrel and into the helical shape are illustrated in FIG. 3A.

In one embodiment the mandrel 38 is tapered, the taper of the mandrel being such that in one embodiment the ratio of the outer diameter of the mandrel at the head end compared to the outer diameter of the mandrel at the inserted end is 8 to 5. In a preferred embodiment the pitch of the helical shape is uniform along its length of 50 mm and in another embodiment the pitch varies at the time of forming the coil. The formed coil is only about 30 cm long ready for being fitted to the shaft. In any event in a preferred embodiment the pitch of the fitted flighting along the shaft will vary starting at 34 mm at the inserted end and increasing to 37 mm towards the head end and in another embodiment the pitch will vary from 42 mm to 45 mm, as described in more detail later in this specification when describing the fitting of the flighting to the shaft.

At least two methods for fitting a helically shaped coil to a tapered shaft can be used.

A first method includes welding a helical coil to the shaft while the coil is under tension. To achieve this the coil is stretched over the shaft until it touches all along the majority of the full length of the shaft and is then welded to the shaft only at each end of the coil at or close to the head end and at or close to the inserted end of the shaft, before releasing the tension applied during stretching. The coil will distribute its helical shape between the fixing points and the pitch is thus even or increases uniformly along the length of the shaft. Additional welds can be used to secure the flighting to the shaft as deemed necessary but this may also increase the possibility of creating distortion of the relatively thin shaft. FIG. 3B illustrates this method, showing one end 21 of the formed coil 20' attached to a frame 18a that happens to be part of a winch arrangement, the prepared tapered shaft 10 is suspended from and attached to the frame by the largest outer diameter end (in this embodiment the 16 mm outer diameter end), and the free end of the preformed coil 20' is attached to the pulley 18b of the winch (not shown). The winch is then operated to stretch the preformed coil 20' over the length of the shaft 10 and the tension and force applied to the coil can be maintained until the coil is fixed to the shaft, typically by welding in the manner described above.

The second method is to over stretch the coil so as to adopt a smaller inner diameter than the outer diameter of the shaft, so that the coil can be lightly tapped onto the shaft, then welded only at each end, the head end and the inserted end, Considerable care is required when using this method to avoid damaging the coil when being fitted to the shaft. This method is most suitable when using a pre-hardened flight since post hardening of a complete auger can have the effect of distorting its shape, such as unwanted bending which then needs to be further processed to rectify. Using the method involving a pre-hardened flight will also require the annealing of the welds to avoid premature fracturing.

One preferred detail of the available flighting options is to create a pitch that increases (say from 34 mm) at the inserted end (say to 37 mm) at the head end. This arrangement ensures the flow of soil is not restricted since the cut (until then compact) soil entering the auger at the inserted end gradually opens up as it travels up the flighting towards ground level for eventual discharge away from the opening being created. In one embodiment the fixing can be achieved by spot-welding 42 (FIG. 4) the helically shaped material 20' preferably twice and not more times along the length of the shaft. Thus the finished auger has an outer diameter of 23 mm at the head end and 17 mm at the inserted end where along the shaft the flighting is situated.

In another embodiment the formed auger being wholly of metal is hardened and in one example of hardening that is achieved by immersion into heated cyanide solution, followed by an oil quench (not shown). Induction as a hardening method can also be used but appropriate selection of the metal of the auger is required. Note also that high carbon steel will need to be annealed before winding it to form the helical flighting.

Figure 4:
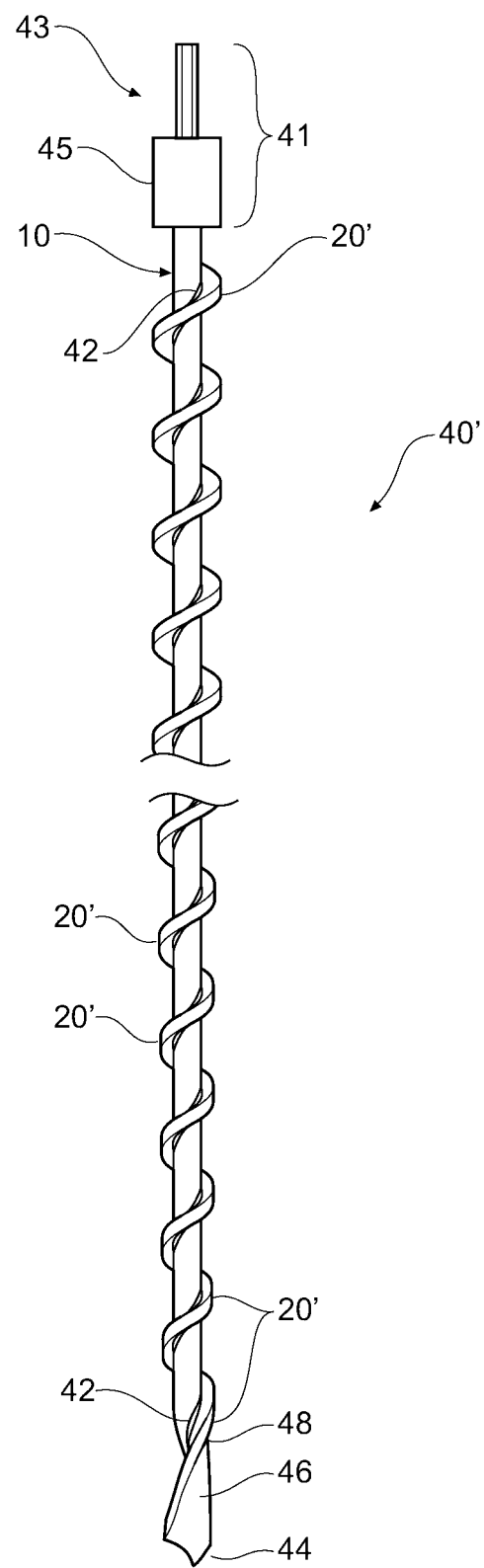
FIG. 4 depicts an embodiment of a flighting fitted to a shaft (note the incomplete depiction of the length indicated by the broken lines)

The auger 40 depicted in FIG. 4 appears to be depicted in a larger scale than that used in FIGS. 1 to 3, however, it should be noted that none of the figures are to any scale, and are merely illustrative of the method and the shapes of the articles depicted.

FIG. 4 also depicts a cutting edge 44 located at the end of the auger 40 having a smaller outer diameter than the rest of the auger forming the inserted end of the auger which when in use creates an opening in the ground suitable for the insertion of an elongate sensor. The cutting edge 44 also creates a volume in the soil below the opening intended for accommodating the sensor housing, the created volume conveniently becomes a final resting place for any soil that happens to fall off the auger as it is withdrawn from the opening and for any soil that is knocked off the side of the opening formed in the soil as the sensor housing is inserted into the prepared opening. The accumulated soil can thus reside in the created volume without unduly restricting the passage of the sensor housing into the opening especially at the end of its travel. One way of assisting the clearance of loose soil from the bottom of the opening formed by the auger is to slightly wet the loose soil by pouring a small amount of water into the opening near the final stages of forming the opening, allowing the soil to aggregate and adhere to the end of the auger and be carried out of the opening when the auger is withdrawn. Water is also helpful when the extracted soil appears dry and the water helps to maintain the soil integrity of the walls of the created opening.

Thus the method of forming an auger 40 preferably includes the step of fixing a cutting edge member 46 to the smaller outer diameter end of the shaft. When using a separate member the fixing can be by way of welding the cutting edge member 46 to the shaft and any excess weld material is ground off and smoothed. Preferably the cutting edge is also welded 48 to the fitted and fixed flighting 20' so as to create a smooth transition between the angled surfaces of the rising cutting edge to the helical form of the flighting. The smoother the transition the better for carrying the cut ground up along the shaft towards the upper portion of the shaft. Wherein some at least of the cut ground material is removed from the opening at ground level. In one embodiment the cutting edge of an auger is formed from flat bar/strip 23.5 mm width by 4 mm depth of 4140 high carbon steel twisted to 100 pitch while at 800° C. (pitch is inclusive of both sides). The cutting portion is 75 mm long, formed by cutting to create a pointed/sharp (relative to the ground hardness) cutting edge. The formed cutting edge is welded to the inserted end of the flight as well as the shaft while the welding area is at 500° C. Hardening of this part of the auger is achieved by water quenching from a temperature of 800° tempering to 550° C. The temperatures used in this specification are indicative and those of skill in the art that use welding and quenching techniques will appreciate the indications provided but may not necessarily use the indicated temperatures.

In one embodiment the larger diameter end of the shaft 10 is formed by, for example, a hexagonally shaped shaft 43, suitable for insertion into a chuck of an electrically powered drill. This shape can be formed before or after the time that the tapered shape is formed. A preferable dimension for the hex drive is so that it can fit a ½" drill, therefore the hex head of the auger should be a minimum length of 35 mm having 11.5 mm dimension across the flats which can be machined on to the circular cross-section form of the shaft.

Additionally in preference the tapered shaft at the head end above the flighting includes a 100 mm long by 30 mm outer diameter portion located between the end of the flighting and the start of the previously described hex shaped end of the auger. This portion of the shaft may not be tapered and it is not preferable for the flighting to be applied to this portion. However, in practical terms this may not be the case and then the practice of forming the opening will be intended to use only that portion of the auger that has the appropriately tapered length portion of the auger. In practice if a small portion of the opening at the very top of the opening formed is of constant diameter there will generally be some latitude and movement possible near the surface of the ground so that the sensor housing can be inserted to a predetermined depth, using a datum line, which will be described later in the specification.

Thus in a preferred embodiment the total length of the auger is 75+1200+100+35 mm equal to 1410 mm.

Hardening can be achieved by a number of techniques, one technique being immersion of the formed tapered auger in to a hot cyanide bath of 840° C. to 850° C., followed by an oil quench, tempering to 450° C. Another technique is induction but only if the material of the flighting is suitable.

It is preferable to have the whole auger case hardened to approximately 50 Rockwell.

In yet a further embodiment the helically shaped material 20' of FIG. 3C is created to have an outer diameter greater the head end than the outer diameter at the inserted end and a lineal length of about 2500 mm. The inner diameter however is of importance and will graduate from wider to narrower and be such that the helical form will slip over the elongate shaft of dimensions the same or similar to those depicted in FIG. 1. The taper of the inside and outside of the helically shaped bar 20' will preferably be about 5 mm per lineal metre.

The fixing of the further embodiment to the shaft is similar to that described previously. However, extra care will be required not to over stretch the coil at the inserted end as there will be less material and if the same tension is applied it my stretch and vary the pitch unpredictably at the inserted end from that achieved at the head end.

In another embodiment there is a method of forming an auger useable for creating an opening 76 (FIG. 8) in the ground, the steps including forming a shaft (not shown) having an outer surface of circular cross-section having constant outer diameter.

This method further includes the step of forming a strip material (not shown) into a helical shape, wherein the strip material has, when formed, an outer wall with a larger outer diameter at one end than the outer diameter at the other end and a substantially constant diameter inner wall structure.

The method further includes passing the helically shaped strip material over the shaft and the dimensions of the outer diameter of the shaft and the diameter of the inner wall of the strip material having a helical shape being such that the outer surface of the shaft abuts the inner wall of the helically shaped strip material (not shown) and fixed thereto as described previously.

The method further includes fixing at multiple points (not shown) the helically shaped material to the shaft to form an auger with tapered helical flighting.

All the further steps described herein in relation to the previously described and illustrated augers are equally applicable to an auger having a constant outer diameter shaft with a tapered helical fighting.

In a further alternative step of forming an auger, a chuck receiving end piece 41 can be fixed to the larger outer diameter end of the auger 40. Referring to FIG. 4 the chuck receiving portion 43 of the end piece 41 is shaped to receive a powered hand drill chuck so that rotational energy can be applied to the auger. The end piece will preferably be made of metal and the fixing by way of welding. The chuck receiving portion of the end piece depicted in FIG. 4 is of a hexagonal shape in cross-section and forms the free end of the auger and the base portion 43 of the end piece has a circular cross-section of larger outer diameter than both the chuck receiving portion and the auger fixed to the shaft of the larger outer diameter end of the auger. Preferable dimensional details are provided earlier in this document. In one embodiment, but not a preferred embodiment a circular base portion of the end piece is conveniently located and shaped to allow a steadying hand of the user of the auger to guide and stabilise the upper end of the auger while in use. However, if the stabilisation apparatus described later, is used the circular base portion may not be required.

FIGS. 5, 6 and 7 illustrate the forming of an opening 76 (FIG. 8) into the ground 70 using an auger 40 of any one of the embodiments described previously. Such an auger is usable for creating an opening in the ground suitable for the insertion of an elongate sensor housing 74 (FIG. 8) where the sensor housing has an outer shape that is circular in cross-section having a smaller diameter at the inserted end relative to the non-inserted end of the sensor housing.

The auger 40 is provided rotational energy with a handheld electric drill 50 with the operator providing a downward force at the same time as the drill provides the rotational force. The operator 52 (FIGS. 6 and 7) is in control of the verticality (with respect to the nominal surface of the ground) of the auger as it is driven into the ground 70 but it is not critical that the prepared opening 76 (FIG. 7) be at exactly right angles to the ground surface 71.

Figure 5A:
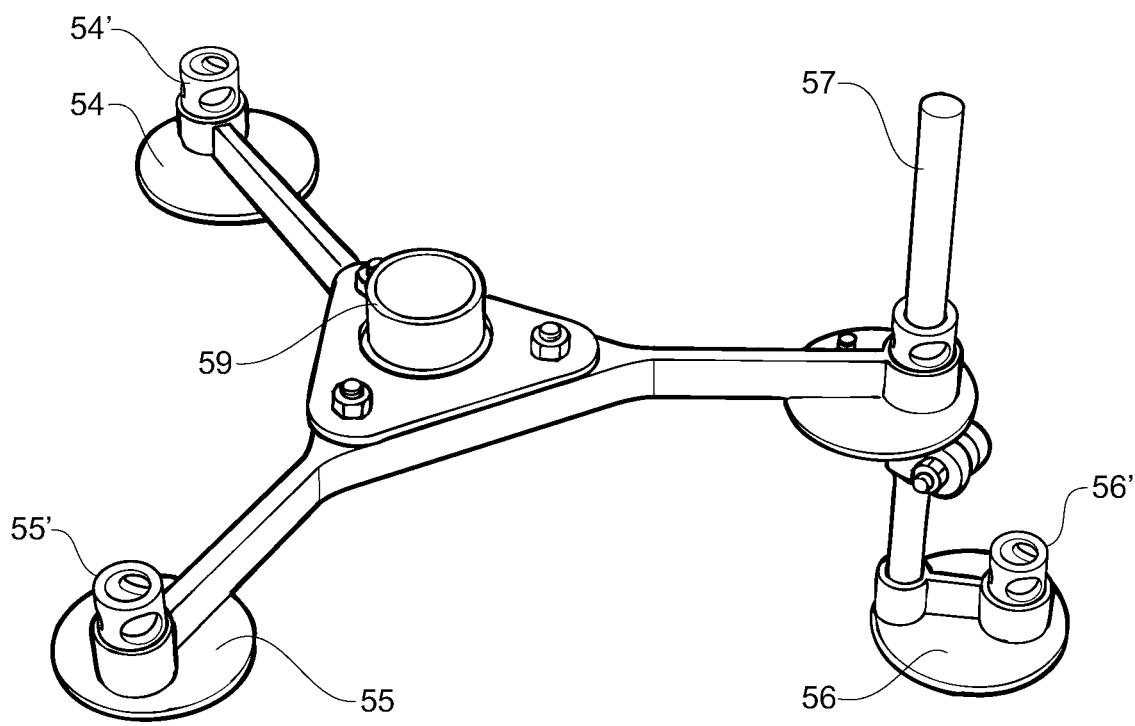
FIGS. 5A and 5B depicts the position and use of a stabilisation apparatus during the formation of an opening in furrowed ground using an auger as depicted in FIG. 4.
Figure 5B:
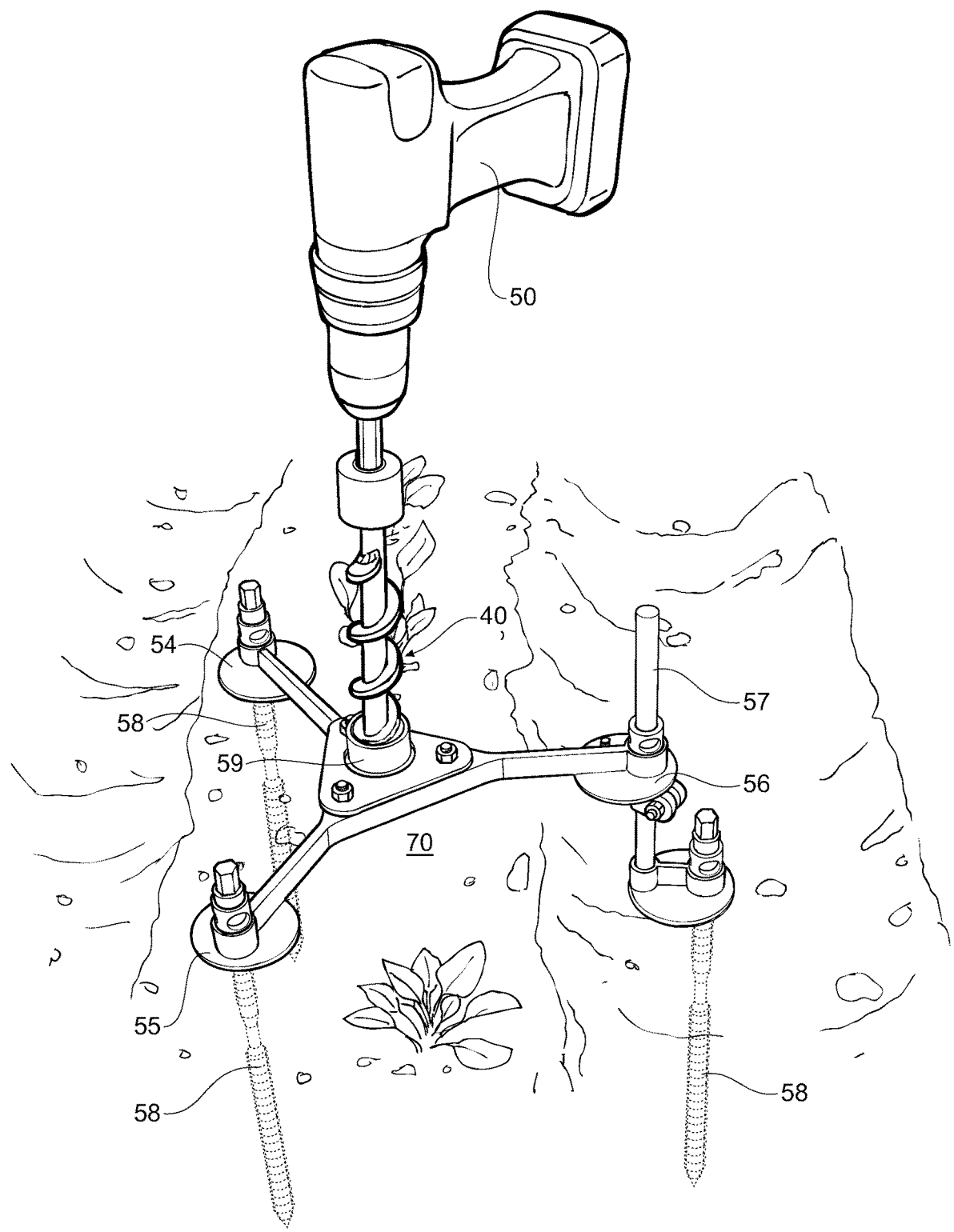

In a preferred arrangement a stabilisation apparatus is used as depicted in FIGS. 5A and 5B. Three base plates 54, 55, and 56 are provided in a joined state and are located so that the area in the middle is where the opening 76 (FIG. 8) in the ground is to be created. Each base plate has a collar 54', 55', and 56' at its radial extremity through which a peg or preferably screws 58 can be inserted and then screwed into the soil so as to connect the stabilisation arrangement to the ground and provide a stable platform. The collars all have holes, in the version depicted, three holes in the wall of the collar, to allow for soil which may be brought up to the surface level during the drilling process to fall away and not become trapped between the screw 58 and the collar, which can restrict the extraction process. The Head of the drill is hex shaped so as to allow for a drill to drive the screw into and out of the soil. Not shown, near the head of the screw there is a hole in the shaft of the head region while allows a rod to be placed and enables manual manipulation of the screw, typically for removal. The stabilisation apparatus depicted in FIG. 5B is positioned over furrowed ground and in the embodiment shown an extension leg 57 is used to allow for the positioning of a further base plate to be located lower than the other base plates while keeping the upper portion of the arrangement substantially horizontal with respect to the overall surrounding soil. The stabilisation apparatus further includes a collar arrangement 59 to form an opening suitable for insertion of the auger. The height of the collar (in one embodiment) is about 10 centimetres above the platform so as to assist the operator of the auger as it is operated and to minimise or eliminate undesirable sideways or tilting movement of the auger during the opening creating process, however, preferably the collar is arranged to articulate slightly (wobble about the nominal vertical axis) so that, as the auger is drilled further into the ground and possibly at a slight angle out of right angles to the stabilisation apparatus, the articulation available in the collar allows the auger to continue to be guided rather than misaligned within an otherwise fixed collar. Forcing the auger through the collar at an angle would have created friction against portions of the collar and against the side of the flighting which is undesirable and could if misalignment to a great enough degree could cease the passage of the auger through the collar or damage the side of the flighting and make the task of creating the opening more difficult.

The operator 52 may occasionally draw the auger 40 fully and/or partially from the opening 76 as the opening is being created to free the ground particles entrained in the helical flighting of the auger. The soil ejected from the auger above the ground level can be caught by a sheet 74 (for example, newspaper sheets) positioned below the stabilisation platform before being installed. Thus when the created opening in the ground 76 has been completed the extracted soil can be easily removed from the area, leaving a clean and debris free opening.

Figures 8, 9:
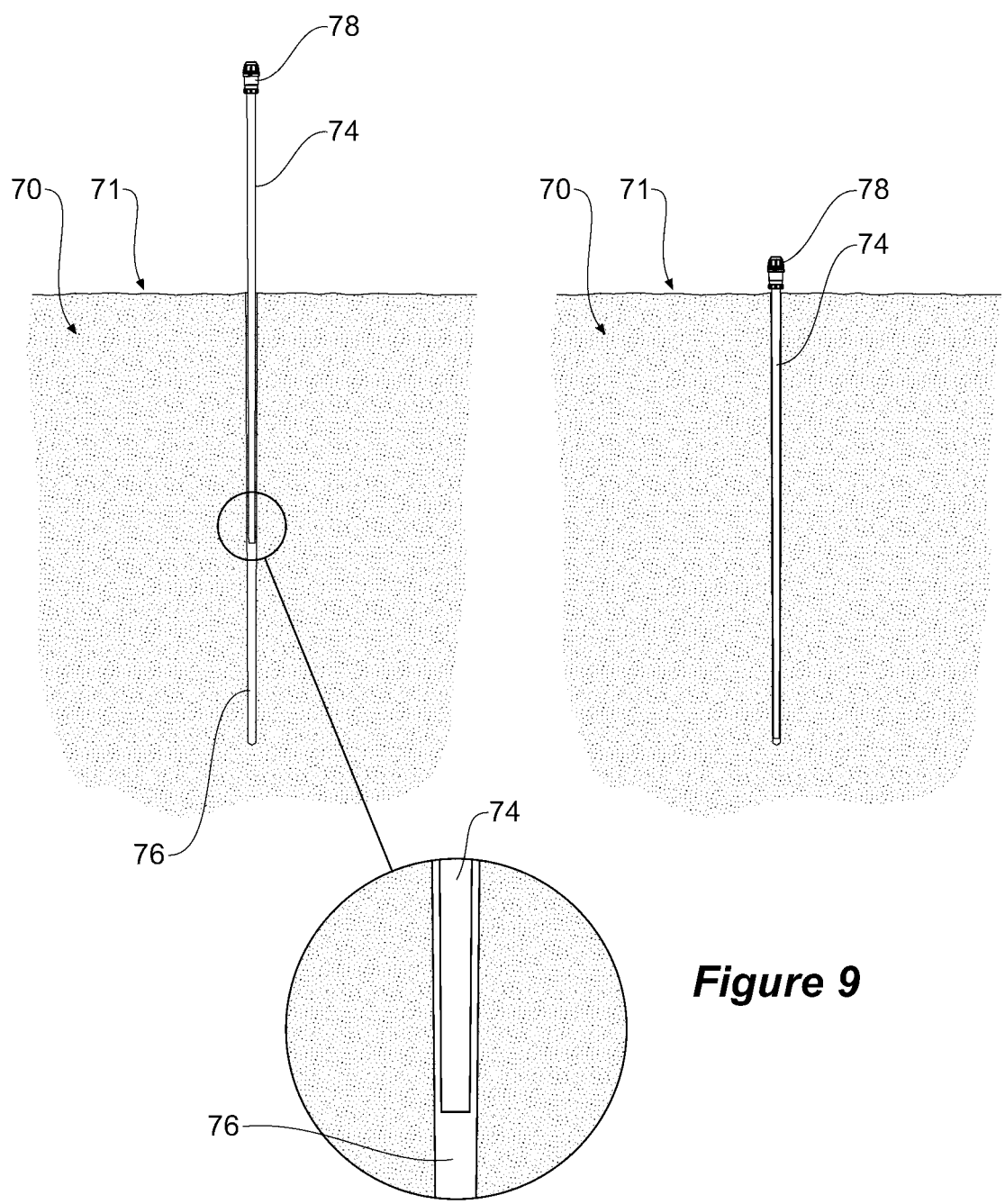
FIG. 8 depicts the partial insertion of a soil moisture sensor housing into the prepared opening in the ground.
FIG. 9 depicts the full insertion of a soil moisture sensor housing into the prepared opening in the ground.

The depth of the created opening 76 as depicted in FIGS. 8 and 9 is approximately the length of the sensor housing 74 and a moisture tight and resistant cap 78 is used to seal off the open end of the sensor housing, so it is not unusual for the last millimetres of travel of the sensor into the ground to be facilitated by stepping onto, or hammering, the top of the sensor into the ground until the top of the sensor housing is flush with the surrounding ground level. The soil sensor is preferably constructed to withstand such treatment. It may also be of assistance to wet the outside of the sensor before insertion into the prepared opening and further to apply a rotational motion to the sensor as well, particularly in clay soils.

In one embodiment of the sensor, the cap 78 contains electronic circuits: one or more of which provide data logging, battery supply, and data communications capability so that the sensor within the housing is self-sufficient and set up to wirelessly provide its readings to a central remote location for storage, collating, further processing and analysis.

It will be noted that FIG. 9 shows that undisturbed ground 70 is in contact with the whole outer surface of the sensor housing 74. This is the ideal condition for maximising the effectiveness of the sensors arranged in an array within the sensor housing, which are in one embodiment, located every 10 cm along the full length of the sensor housing thus providing a means to record soil moisture and other characteristics of the soil in the location of the prepared opening 76 in a field of growing crop (not shown to de-clutter the figures).

The lack of air spaces and gaps, in particular, between the outer surface of the sensor and the surrounding ground is substantially avoided by the tapered outer shape of the sensor housing and the prepared opening, since the two shapes correspond before the insertion of the sensor and become conforming as the sensor housing meets the surface of the soil and becomes uniformly compacted as the sensor is pushed further into the ground. In prior soil sensor installation arrangements the prepared opening and the sensor housing may have corresponded (in that they were both cylindrical) but no amount of downward pressure would improve the conformance of the outer surface of the sensor housing and the wall of the prepared opening which is undisturbed soil. Indeed the need to maintain the cylindrical form of the opening could not be consistently achieved, whereas the above described use of a tapered auger and tapered sensor housing provides for self-conformance of the sensor housing to the inner wall of the prepared opening.

The following paragraph will introduce the concept of volume in the context of the volume of the created opening in the soil and volume of a sensor housing, since it is otherwise difficult to express the size of an opening and/or a sensor housing which is formed by a wall that has varying cross-sectional diameter (when describing a longitudinal shape having a circular cross-section) that in effect tapers from a wider end to a less wide end.

The type of soil may affect whether the volume of the opening created by an auger will provide a matching volume in that soil for a sensor housing of a particular volume. For example, a very elastic soil type like clay will readily accommodate a created opening which is an exact match or slightly smaller volume than the sensor housing to be inserted since the downward force applied to insert the sensor housing will ensure that the outer surface of the sensor housing will conform to the elastic surrounding soil. Yet further in a very coarse aggregate type of soil the tapered form of the soil sensor will assist to smooth the inside surface of the opening in such soil as it is inserted to the full depth of the prepared opening. However, in another example, when the soil type is, for example, a class 3 carbonate a soil characterised by having a high finely dispersed lime content, the volume of the opening created by the auger needs to exactly match the volume of the portion of the sensor housing to be inserted, because that type of soil is effectively the same as set cement (no aggregate) and there will be no give no matter the amount of force used to insert the sensor housing. Thus consideration of the soil type when selecting an auger is preferred. It may be though that with experimentation it is possible to produce an auger with a volume to suit most installation requirements, or to provide a variety of sensor housing volumes.

Thus an auger useable for creating an opening in the ground for a soil sensor for use in the ground having a predetermined volume and a tapered outer surface, includes an auger made in accordance with the methods described and defined in this specification. The auger having a shaft having an outer surface of circular cross-section having an larger outer diameter at one end than the other end and a strip material having a helical shape with an inner wall having a larger inner diameter at one end than the other end of the helical shape wherein the helically shaped material is fixed over the outer diameter of the shaft to form a tapered auger with helical flighting. The volume of the opening created by an auger in the ground will provide a matching volume for a sensor housing of a predetermined volume such that substantially the full length of the tapered outer surface of the sensor is adjacent the ground along the full length/depth of the created opening.

The invention claimed is:

1. A method of forming an auger useable for creating an opening in the ground, including:
    forming a shaft having an outer surface of circular cross-section having as larger outer diameter at a head end than an inserted end and there is a continuous taper of the outer surface between the ends;
    forming a strip material into a helical shape having an inner wall with a larger inner diameter at one end than the other end and there is a continuous taper of the wall between the ends;
    passing the helically shaped material over the outer diameter of the shaft until a portion of the tapered inner wall of the helically shaped material abuts the outer tapered surface of the shaft; and
    fixing the helically shaped material to the shaft to form a tapered auger with helical fighting with a tapered outer shape from the head end to the inserted end;
    wherein the step of forming a rectangular strip material into a helix includes the following steps:
        fixing one end of the strip material to the spindle of a lathe, the lathe having a headstock end and a tailstock end, the spindle of the lathe rotated at a workable rate determined by the speed at which a helically shaped coil forming is to take places; and
        drawing the strip material in the direction away from the spindle along a portion of the length of and onto a mandrel located between the headstock end and the tailstock end of the lathe.

2. The method according to claim 1 including the further step:
    fixing a ground cutting edge member to the smaller outer diameter end of the shaft.

3. The method according to claim 1 further includes the following step:
    surface hardening the formed tapered auger.

4. The method according to claim 1, includes the following step: surface hardening the formed auger wherein the surface hardening step is hardening by immersion into heated cyanide solution, followed by an oil quench.

5. The method according to claim 1 wherein the shaft has an average taper of 5 mm per lineal metre.

6. The method according to claim 1 wherein the shaft is 1200 mm long having a 6 mm difference from a largest outer diameter end to a smallest outer diameter end of the shaft.

7. The method according to claim 1 wherein the strip material is rectangular in cross-section.

8. The method according to claim 1 wherein the strip material has a 5 to 7 ratio of thickness to width.

9. The method according to claim 1 wherein the strip material is 2500 mm long before being formed into a helical shape.

10. The method of claim 1, wherein the step of forming the strip material further includes the following step:
    laser cutting a strip of material into a trapezoid shape before forming the cut strip into a helical shape.

11. The method according to claim 1, wherein the step of forming a strip of material into a helical shape, the pitch of the helical shape increases from that at the smaller inner diameter of the helical shape towards the larger inner diameter of the helical shape.

12. The method according to claim 1, further including the step: surface hardening of the formed helical shape before passing the helical shape over the outer diameter of the shaft.

* * * * *